Nov. 19, 1935.   M. R. DE VITA   2,021,500

PNEUMATIC TIRE WITH INTERNAL LOAD RINGS

Filed Feb. 14, 1935

INVENTOR.

Marino Roy De Vita

Patented Nov. 19, 1935

2,021,500

UNITED STATES PATENT OFFICE 2,021,500

PNEUMATIC TIRE WITH INTERNAL LOAD RINGS

Marino Ray De Vita, Brooklyn, N. Y., assignor of one-half to Arthur V. Levey, New York, N. Y.

Application February 14, 1935, Serial No. 6,519

3 Claims. (Cl. 152—10)

This invention relates to an improved pneumatic vehicle tire, and its leading object is to provide a tire with means forming a part of the wall structure of the tire, which will prevent rim cutting and splitting or breaking of the side wall of the tire, and provide internal support to permit of the tire giving satisfactory load supporting service when the inner tube is partly or wholly deflated.

Another object of the invention is the provision of a pneumatic vehicle tire with a pair of internal load supporting rings, which are disposed in outwardly converging relation, so that when the tire is excessively displaced by the action of a road depression or a boulder, or in partial or complete deflation, the internal rings will be brought together by the load upon the tire, to provide a resilient composite internal load support, coextensive with the annular body of the tire, which will prevent the crushing of the wall of the tire and the inner tube against the rim, or against the ground, and make possible the continuation of the travel of the vehicle, with a partly deflated tire, without subjecting the tire or its inner tube to partial or complete destruction.

Another object of the invention is the provision of a pneumatic vehicle tire with a pair of internal load supporting rings, so arranged with reference to the annular air chamber of the tire, that the inner tube will be divided into separate air compression chambers, when the tire is disabled by the partial deflation of the inner tube, and the remaining air within the tire can be utilized to cushion the load upon the tire, during continued traction of the tire.

With the above and other objects in view the invention consists in certain details of structure, combinations and arrangements of parts, clearly described in the following specification and fully illustrated in the drawing, wherein.

Figure 1:
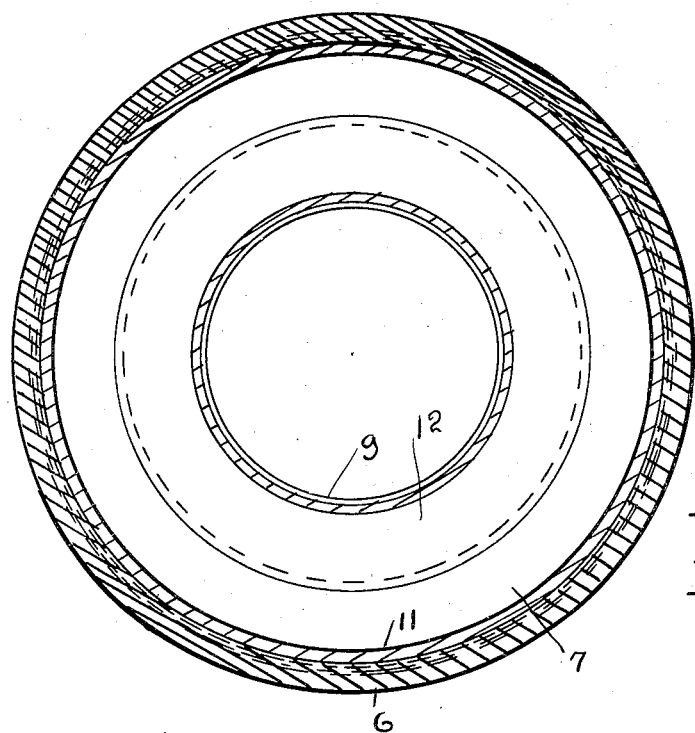
Fig. 1 is a vertical sectional view through the improved tire, illustrating the annular construction of the internal load supporting rings.
Figure 2:
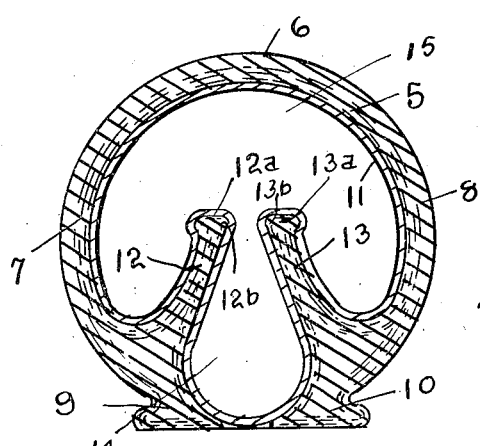
Fig. 2 is an enlarged vertical sectional view, illustrating the converging relation of the internal rings, and showing the same with reference to an inflated tire.

Referring to the accompanying drawing, illustrating the practical construction of the improved tire, 5 designates the annular and tubular wall of the tire casing, which includes the tread portion 6, the side walls 7 and 8, and the base rim portions 9 and 10, formed integral therewith.

The tire is inflated with a suitable inner tube 11, in the normal manner. To support the tread portion of the tire against complete collapse, when the inner tube is partially or wholly deflated, I form on the base portion 9 an internal load supporting annular ring 12, and also form on the base portion 10 a similar internal load supporting ring, 13.

The two load supporting rings are attached to the base rim portions of the tire in such manner that the rings will converge outwardly toward each other, but during normal traction of the tire, with the inner tube properly inflated, the rings will not converge to the point of physical engagement at the circumferential marginal outer portions.

The annular load supporting ring 12 is widened at its outer, circumferential edge, laterally in both directions, to provide a broadened load or thrust face 12a, and the ring 13 is similarly constructed to provide the widened thrust face 13a. In this wall a constricted inner shoulder 12b is formed on the ring 12 and a constricted ring shoulder 13b is formed on the ring 13.

The base portions of the rings are spaced apart to provide an annular chamber 14 therebetween, which is substantially wedge shaped. When the inner tube is inflated it is forced into this annular wedge shaped chamber, and also against the inner wall surface of the tire, and against the inner and outer radial surfaces of the two internal load supporting rings.

During normal traction of the tire, with the inner tube properly inflated the air compartment of the tire is thus shaped into the inner wedge shaped compartment 14, and an outer C-shaped air compartment 15, with the tread portion of the tire supported out of riding engagement with the outer marginal and widened portions of the internal rings.

The tread portion of the tire is not thickened, so that the wall of the tire remains as flexible as in ordinary standard tires, and will possess equal riding qualities as that of the standard tire.

But when the tire is excessively displaced, by the action of a rock or the sides of a depression in the road, against the rolling tire, the tread portion of the tire will be forced inwardly and will engage the outer portions of the internal rings, which will then be moved into converging, self bracing, relation, and will receive the additional thrust imposed on the tire, and thus prevent further internal collapse of the tire wall.

When the tire is partially deflated, as a result of a puncture, the tread portion of the tire will be forced into riding engagement with the two internal rings, which will at the base of the tire, during traction, be kept in converging, load supporting relation, by the pressure of the load upon the tire and wheel, and again the tire will be prevented from extreme collapse against the wheel rim. This will also limit the flattening action generated upon the inflated tire during traction, so cracking of the side walls, as a result of extreme flattening of the tire is avoided.

When there is partial collapse of the tire wall, the main air chamber 15 is collapsed, so that there is then formed two outer air chambers 15a and 15b, outwardly and inwardly of the internal rings, and the central air chamber 14 is closed at the base, thus providing at the base three air chambers, in which the remaining air of the tire will be subject to compression, to provide a cushion for the load during traction.

Due to the fact that the internal load supporting rings are disposed in converging relation to each other, these rings provide resilient rails to carry the load during traction, and are capable of giving, or yielding, relative to one another, so as to absorb the shocks produced in traction.

It is the accepted practice now to operate pneumatic vehicle tires with relatively low pressure. During the starting of the vehicle, the tires supporting the same for traction are subject to excessive displacement, causing an extreme flattening of the base of each tire. This extreme flattening tends to slow up the starting speed of the vehicle, and the internal load carrying rings thus tend to limit the degree of flattening, during starting, and to increase the acceleration of traction.

Figure 3:
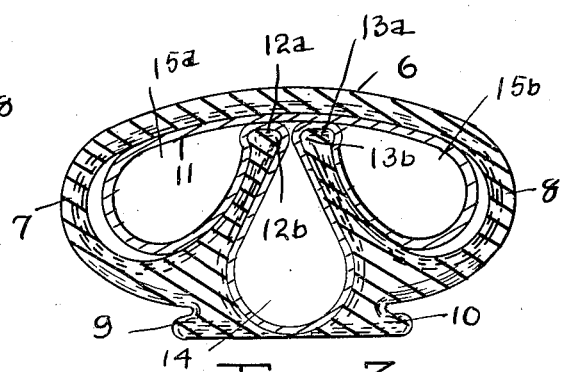
Fig. 3 is a similar view, illustrating the tire partly collapsed to bring the tread area of the tire casing in load bearing engagement with the internal rings.

The internal rings limit the collapsing action of the tire, without diminishing the flexibility and riding qualities of the tire during normal traction. But when there is sudden deflation the rings receive the thrust or load normally carried by the compressed air in the tire, and the degree of collapse of the tire as a result will be approximately one half of the amount of tire collapse normally resulting from sudden deflation during traction. It will be seen, therefore, that the internal rings provide an important safety factor, in enabling the rolling tire to maintain its course, without dangerous road displacement, and possibly wreckage of the vehicle. The entire wall of the tread portion of the tire is of standard thickness and flexibility, so that the best rolling and riding action and resistance to skidding and shocks is obtained. In my improved tire construction, the base of the tire is re-enforced in such a manner that the flexibility of the tread is not diminished, but the extreme collapsing of the tread is prevented. When the tread is collapsed as shown in Fig. 3 against the thrust or load rings 12 and 13, these rings will cushion the load imposed by the collapse of the tread, and will move into engaging position, and if the load is sufficient will bend against each other to cushion the load.

Having described my invention, I claim:—

1. A pneumatic tire consisting of a casing providing an annular tubular wall including a flexible tread and a base provided with rim engaging means, the base being formed with integral annular load thrust rings projecting from the opposite sides thereof and adapted to have converging engagement with each other on the collapse of the tread to limit such collapse and to provide cushioning means for such collapse, and a pneumatic tube arranged in the casing and having contacting engagement with the casing and with said load thrust rings and the base.

2. A pneumatic wheel tire consisting of a casing provided with an annular tubular wall including a flexible casing and a split base adapted to be mounted on a wheel rim, said base comprising annular sides supporting the flexible casing, each of said annular base sides having an integral load supporting ring formed thereon and projecting inwardly thereof, said load supporting rings projecting in converging relation to each other and normally separated from each other, and a pneumatic tube arranged in the casing and having contacting engagement with the inner surface of the casing and with the opposite surfaces of the load supporting ring and the inner surfaces of the sides of the base, said load supporting rings being adapted to yield against each other on the collapse of the casing to limit such collapse and to cushion the load producing such collapse.

3. A vehicle tire consisting of a flexible casing having a split rim engaging base, each side of said base being formed with an annular ring projecting radially thereof within the casing, said rings being disposed in converging relation to each other and being adapted to support the casing upon its collapse, and a pneumatic inner tube disposed in said casing and having contacting engagement with said rings and the casing to support said casing in normal traction against collapse.

MARINO RAY DE VITA.